Figure 1:
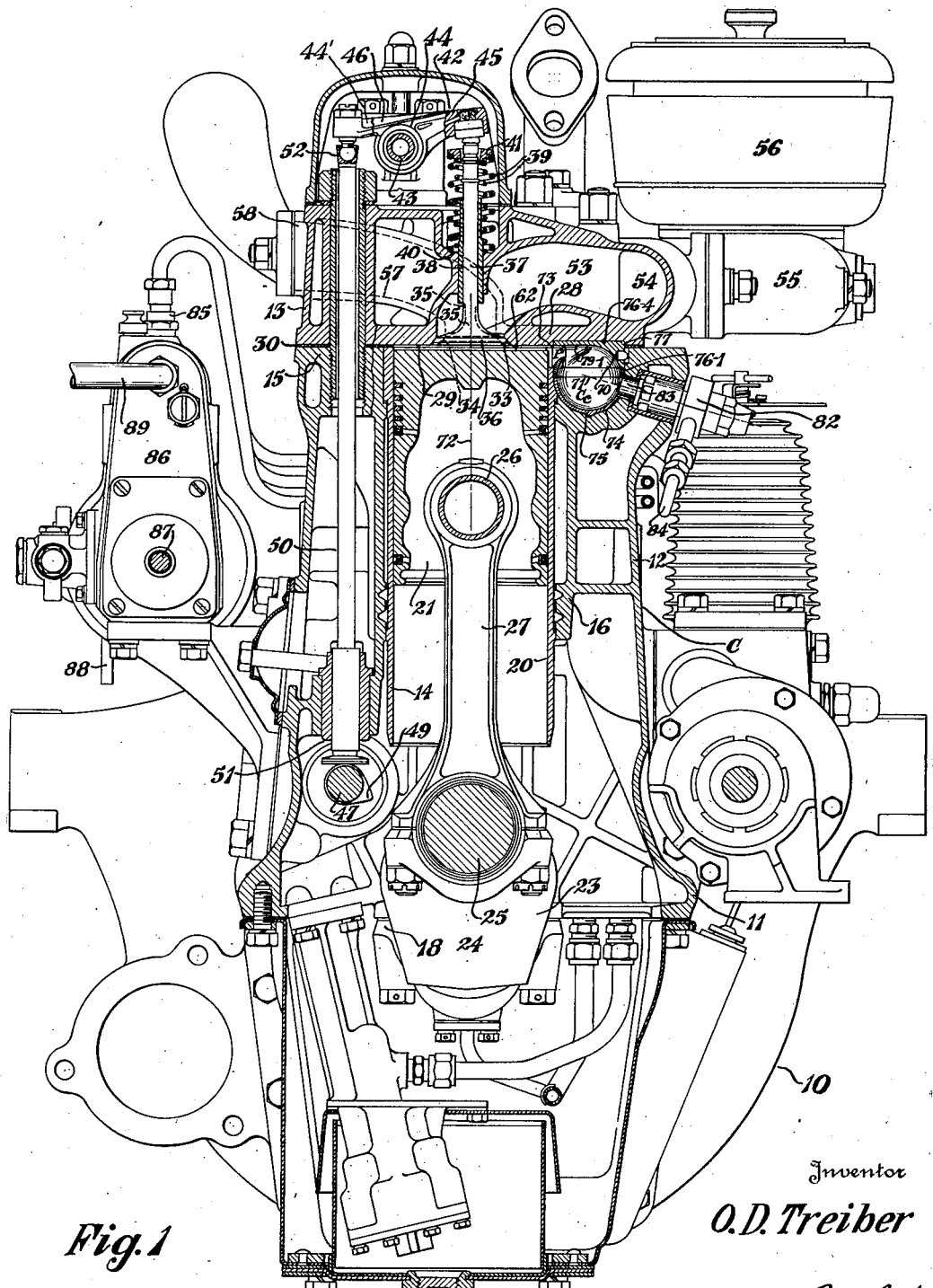

Dec. 1, 1936. O. D. TREIBER 2,062,951
COMPRESSION IGNITION INTERNAL COMBUSTION ENGINE
Filed Aug. 8, 1934  2 Sheets—Sheet 2

Inventor
O. D. Treiber
Attorneys

Patented Dec. 1, 1936

2,062,951

UNITED STATES PATENT OFFICE 2,062,951

COMPRESSION IGNITION INTERNAL COMBUSTION ENGINE

Otis D. Treiber, Canton, Ohio, assignor to Hercules Motors Corporation, Canton, Ohio, a corporation of Ohio Application August 8, 1934, Serial No. 738,979

3 Claims. (Cl. 123—32)

My invention relates in general to internal combustion engines of the compression ignition type and having preferably spherical injection, mixing, and combustion chambers of relatively small volume, one for each cylinder of the engine, the maximum cylinder volume being relatively large, and each cylinder and the associated preferably spherical chamber being communicatingly connected with each other by a passageway.

My invention relates more particularly to compression ignition engines of the foregoing general type and which include the improvements set forth in my prior U. S. Letters Patent No. 1,960,093, issued May 22, 1934, in which is disclosed and claimed a high speed, high compression, high power, compression ignition internal combustion engine in which the spherical chambers are located entirely at the side of the cylinders, and in which the passageways open into the cylinders through the sides thereof, and in which the normally upper surfaces of the passageways are flat laterally continuous extensions of preferably flat lower faces of the cylinder head and are tangential with the spherical inner surfaces of the spherical or constant volume chambers, and which engine is further characterized by a sideward and upward injection of the liquid hydrocarbon fuel into the spherical chambers, each fuel spray having an origin preferably at the crank shaft side of the associated passageway, and being directed sidewards and upwards towards the passageway and flat cylinder head inner face.

Engines including the improvements set forth in my said U. S. Patent No. 1,960,093 are characterized by operating at relatively high speeds which may be from 2000 to 3000 R. P. M., and at relatively high mean indicated pressures which may be as high as 160 pounds per square inch at 2000 R. P. M., and with a consequent relatively high power output, which is accomplished at an economical rate of fuel consumption.

In such engines, it is desirable that the inner curved surfaces of the constant volume chambers be spherical to the greatest possible extent, but on the other hand in commercial production, difficulties are encountered in attaining the desired maximum spherical inner surface area for the constant volume chambers, when the same are formed as set forth in said U. S. Patent No. 1,960,093, by two members, one a normally lower hemispherical shell and the other a normally upper member having a cavity therein which includes spherical inner surface portions and passageway face portions, the two members registering with one another at abutting circular edges of their respective spherical inner surfaces.

Also when the constant volume chambers are formed by two members as set forth in my said U. S. Patent No. 1,960,093, it is relatively difficult to commercially produce the members so as to form thereby the constant volume chamber end of the connecting passageway, when as is preferable the height of the connecting passageway is less than the radius of the spherical inner surface of the constant volume chamber.

From another standpoint, when such engines are of certain sizes, and run at certain speeds, the operation of the engines is accompanied by a slightly objectionable "knock" or "detonation".

The objects of the present invention, include the provision of a compression ignition internal combustion engine of the above set forth general character, and more particularly of the type set forth in my said U. S. Patent No. 1,960,093, and in which the constant volume chambers are formed by parts adapted for relatively easy commercial production, and which form constant volume chambers having a maximum internal spherical surface area, and the parts of each constant volume chamber fitting with one another and forming the constant volume chamber end of the connecting passeway with a height less than the radius of the spherical inner surface, and which are furthermore constructed and arranged so as to substantially eliminate "knock" or "detonation" in the operation of the engine, without any substantial loss of power.

The foregoing and other objects are attained by the improvements, apparatus, parts, combinations, and sub-combinations which comprise the present invention, and the nature of which is set forth in the following general statement and preferred embodiments of which, together with their mode of use, are set forth in the following description, and which are particularly and distinctly pointed out and set forth in the appended claims forming part hereof.

The nature of the improvements of the present invention may be described in general terms as including, in an internal combustion engine of the general type having one or more preferably spherical constant volume chambers and of the more particular type thereof set forth in my said U. S. Letters Patent No. 1,960,093, a construction and arrangement by which each constant volume chamber is formed by three registering parts or members, one of which members may be a hemispherical shell having a hemispherical inner surface, another of which members is an intermediate ring member registering with the shell and having an inner spherical surface or zone providing a continuation of the spherical inner surface of the shell, and the other member of which registers with the ring member and includes inner spherical surface portions, a flat surface extending tangentially from the spherical inner surface portions, and opposite side surfaces converging with the sides of the flat tangential surface and with the spherical surface portion, the flat tangential surface, the opposite side surfaces, and an annular end face of the intermediate ring member forming the constant volume chamber end of the connecting passageway.

For minimizing and substantially eliminating "knock" and "detonation" without any substantial loss of power, the intermediate ring member is provided with deflector means preferably a tongue or lip which extends into the passageway opening and whose inner surface is a continuation of the spherical inner surface of the constant volume chamber, and the tongue or lip is adapted to intercept the conical fuel spray injected thereagainst towards the passageway.

The area of the lip or tongue is relatively small as compared with the total area of the passageway, the passageway opening above and about the sides of the lip or tongue.

The engine may include other improvements as illustrated in the drawings and/or as hereinafter set forth.

Figure 2:
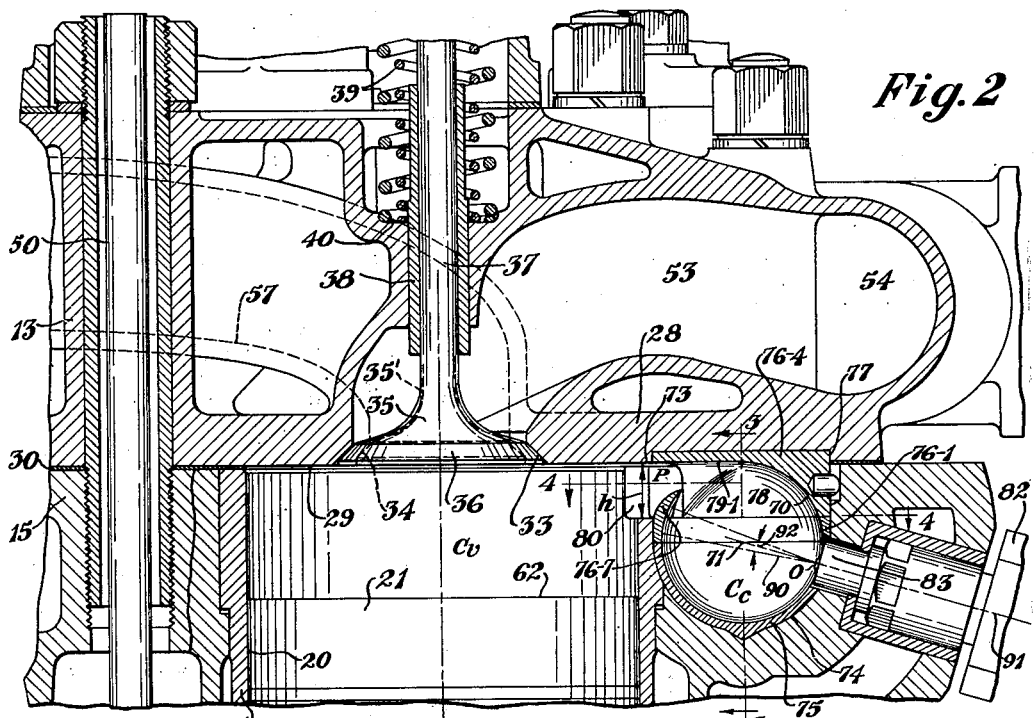
Figures 3, 5:
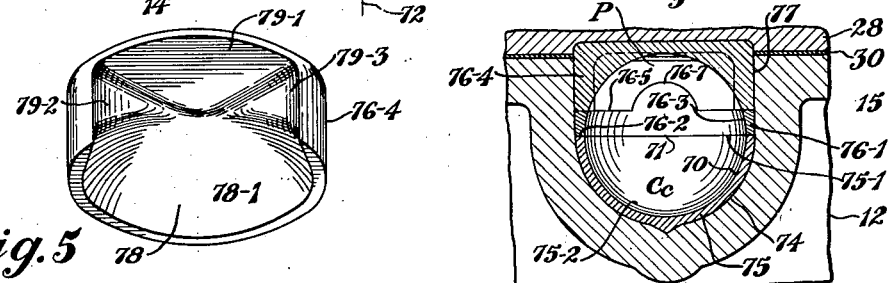
Figure 6:
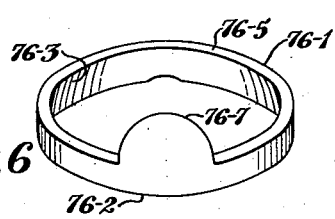
Figure 4:
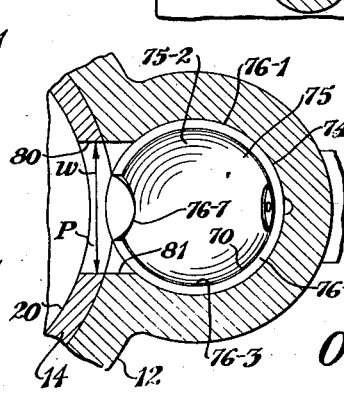
Figure 7:
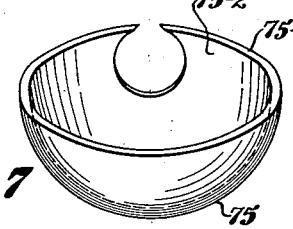

By way of example, a compression ignition internal combustion engine embodying the improvements of my said U. S. Patent No. 1,960,093 and the present improvements thereof, is illustrated in the accompanying drawings forming part hereof, in which Figure 1 is a transverse sectional view of the engine with portions broken away to illustrate details of construction and arrangement, and in particular to illustrate the construction and arrangement of one of the varying volume chambers formed in the bore of one of the cylinders between its piston and the cylinder head, the adjacent constant volume chamber formed according to the present improvements and the nozzle for injecting fuel therein, and the passageway also formed in part according to the present improvements and connecting the constant volume chamber with the varying volume chamber, and the piston of the engine is located in the cylinder at its top dead center position just at the end of the compression stroke of the piston and with others of the engine parts shown in their relative positions when the piston is at top dead center position and has cut-off communication between the varying volume chamber of the cylinder and the passageway leading to its constant volume chamber;

Fig. 2, an enlarged fragmentary view similar to Fig. 1, and in which the piston is shown displaced from the cylinder head and from the passageway, and may be considered to be traveling towards the cylinder head on the compression stroke, and before commencing to traverse the end of the passageway terminating in the cylinder bore;

Fig. 3, a fragmentary vertical sectional view thereof as on line 3—3, Fig. 2, for clearly illustrating the details of construction and arrangement of the improved constant volume chamber;

Fig. 4, a fragmentary horizontal sectional view thereof as on line 4—4, Fig. 2, also for clearly illustrating the details of construction and arrangement of the improved constant volume chamber;

Fig. 5, a detached perspective view illustrating the details of construction of one of the preferred removable normally upper or top constant volume chamber forming members;

Fig. 6, a detached perspective view illustrating one of the intermediate constant volume chamber forming members or rings; and Fig. 7, a detached perspective view illustrating one of the preferred normally lower hemispherical liner shells or constant volume forming members.

Similar numerals refer to similar parts throughout the several views.

The illustrated compression ignition internal combustion engine is indicated generally at 10 and includes the improvements of my prior U. S. Patent No. 1,960,093 and the present improvements thereof.

The engine 10 is a six cylinder, four stroke cycle, single action, high speed, compression ignition internal combustion engine, in which the air for combustion is obtained normally directly from the atmosphere, and in which separate quantities or charges of the preferred liquid hydrocarbon fuel, such as Diesel oil, are successively injected into the combustion chambers of the engine at successive timed intervals, one charge being injected into the combustion chambers of each cylinder during each four stroke cycle of the piston operatively mounted in the cylinder.

The engine 10, includes in combination with other parts of a high speed internal combustion engine, a unitary casting C including a lower crank case portion 11 and an upper cylinder block portion 12, and front and back cylinder heads 13 are secured at the upper end of the cylinder block portion 12, each cylinder head accommodating three cylinders, and one cylinder head 13 being shown in the drawings.

The cylinder block portion 12 includes therein walls forming the cylinders, one of which is illustrated in detail in the drawings and is indicated at 14, and each cylinder 14 as illustrated is preferably in the form of an externally shouldered sleeve which extends through and is seal seated in registering bores formed respectively in the normally upper cylinder block portion wall 15 and the normally lower cylinder block portion wall 16.

Each sleeve cylinder 14 has a bore 20, and in each cylinder bore 20, a piston 21 is operatively mounted for reciprocation in a usual manner for high speed engines.

A crank shaft 23 is operatively mounted in a usual manner for high speed engines in main bearing blocks 18 provided in the crank case portion 11, and the crank shaft 23 includes, opposite each piston 21, crank arms 24 between the outer ends of which extends a crank pin 25, and each piston has operatively mounted therein in a usual manner for high speed engines a wrist pin 26, and each crank pin 25 is operatively connected with the wrist pin 26 of the opposed piston by a connecting rod 27.

It is to be particularly noted that the crank shaft 23, the connecting rods 27, the wrist pins 26, and the pistons 21 are not only operatively associated with each other as aforesaid in a usual manner for high speed engines, but are each of the size, proportion, and minimum weight, characteristic of such parts for high speed engines.

Each cylinder head 13 includes a normally lower wall 28 which is provided for each cylinder covered thereby with a preferably flat normally lower surface 29 extending transversely across the upper end of the bore 20 of the particular cylinder.

A usual gasket 30 is interposed in a usual manner between the normally lower wall 28 of each of the cylinder heads 13, and the normally upper wall 15 of the cylinder block portion 12.

As illustrated, the engine 10 is a valve-in-head engine, and accordingly each normally lower wall 28 of the cylinder heads 13 has formed therein above the normally upper end of the bore 20 of each cylinder covered thereby, an air intake valve seat orifice 33 and an exhaust valve seat orifice 34, and each of the valve seat orifices has a valve seat formed therein.

A valve 35 is operatively associated with each valve seat orifice 33, and a valve 35' is operatively associated with each valve seat orifice 34, and each of the valves includes a valve head 36 fitting in its respective seat, and a valve stem 37 extending upwardly from the head.

The cylinder heads 13 have mounted therein valve stem guide tubes 38, one for each valve stem 37, and each valve head 36 is normally maintained in its seat by usual means such as a set of compression springs 39, one end of which reacts against a spring seat 40 formed about each valve stem guide tube 38 in the cylinder heads 13, and the other end of which reacts against a flanged washer 41 secured in a usual manner at the upper end of the particular valve stem 37.

Rocker arm means indicated generally at 42 are operatively associated with the valves, and include rocker arm shafts 43, one of which is mounted in the top of each cylinder head 13.

The rocker arm means furthermore includes for each cylinder a rocker member 44 for the air intake valve for the particular cylinder, and a rocker member 44' for the exhaust valve for the particular cylinder, and each of the rocker members includes a valve stem actuating arm 45 extending from one side of its rocker arm shaft 43 above and in operative association with the upper end of its particular valve stem, and likewise each rocker member includes a push rod actuated arm 46 extending from its side of the rocker arm shaft 43.

A cam shaft 47 is operatively mounted in a usual manner in the crank case portion 11 at one side of the crank shaft 23, and the cam shaft is driven in a usual manner by the crank shaft as by means of gearing located within the gear housing, not shown, provided at one end of the crank case.

A cam 49 is provided on the cam shaft 47 for each valve, and between each cam 49 and its opposed push rod actuated arm 46 there is operatively mounted a push rod indicated generally by 50, each push rod 50 being slidably mounted in push rod guide bearing means indicated generally by 51 and located in the crank case portion 11, and the lower end of each push rod abuts against the cam surface of its cam 49, and the upper end of each push rod 50 is provided with a ball and socket connection 52 with its push rod actuated arm 46.

Each air intake valve seat orifice 33 communicatingly connects with one end of an air intake port or passageway 53, the intake ports 53 being formed in the walls of the cylinder heads 13, and the intake ports of each cylinder head connecting at their outer ends with an intake manifold 54, and each intake manifold 54 communicatingly connecting as by means of an elbow 55 preferably with an air cleaner 56.

Each exhaust valve seat orifice 34 communicatingly connects with one end of an exhaust port or passageway 57, the exhaust ports 57 being formed in the walls of the cylinder heads 13 and the exhaust ports of each cylinder head terminating at their outer ends in a connector flange 58 whereby the exhaust ports may be communicatingly connected with an exhaust manifold, as shown.

The engine 10 is furthermore provided with suitable cooling means and lubricating means, certain of the component parts of which are shown in the drawings, but which need not be described in detail in connection with the present improvements.

In the engine 10, a chamber $C_v$ is formed within the bore 20 of each cylinder 14 and between a normally top or end flat circular face 62 of the piston 21 operating within the particular bore 20 and the opposite flat circular normally lower surface or face 29 of the normally lower cylinder head wall 28 covering the particular bore 20.

Each of the chambers $C_v$ by reason of the reciprocation of the piston forming one wall of the same may be termed a varying volume chamber, and in the engine 10, at top dead center, that is, when the end face 62 of each piston 21 has reached its position of maximum travel away from the crank shaft 23, there is only mechanical clearance between the end face 62 of the piston and the opposite flat cylinder head inner face 29.

Walls of the engine form constant volume chambers, one for each cylinder. Each constant volume chamber $C_c$ is located closely adjacent to and entirely at the side of the corresponding varying volume chamber $C_v$; and between each constant volume chamber $C_c$ and its cylinder, walls of the engine form a passageway P communicatingly connecting at one end with the particular constant volume chamber $C_c$ and at the other end with the cylinder bore of the adjacent varying volume chamber $C_v$.

Each constant volume chamber $C_c$ is formed with a curved inner surface 70 which is symmetrical about an axis extending through the center 71 of the constant volume chamber and at right angles or normal to the plane passing through the center 71 of the constant volume chamber and the longitudinal axis 72 of the bore of the adjacent cylinder.

As illustrated, the curved inner face 70 of each constant volume chamber $C_c$ is preferably spherical.

Each passageway P connecting a particular constant volume chamber $C_c$ with the adjacent varying volume chamber $C_v$ is provided with an inner face 73 which is laterally continuous with the preferably flat inner cylinder head face 29 of the adjacent varying volume chamber $C_v$, and each laterally continuous passageway face 73 is tangential with the curved inner surface 70 of the constant volume chamber $C_c$ connected with the adjacent varying volume chamber $C_v$ by the particular passageway P.

The width $w$ of each passageway P is preferably as illustrated somewhat less than the diameter of the preferred spherical inner surface 70 for each constant volume chamber $C_c$, and the minimum height $h$ of each passageway P is preferably somewhat less than the radius of the preferred spherical inner surface 70.

As illustrated each constant volume chamber Cc is formed in a socket 74 provided in the upper end wall 15 of the cylinder block portion 12. The bottom surface of each socket 74 is hemispherical and the top surface of each socket 74 is cylindric and tangential with the bottom hemispherical surface.

Preferably a removable liner shell 75 is located in the bottom of each socket 74, each liner shell 75 being preferably externally and internally hemispherical, and the internal hemispherical surface of each liner shell 75 forming a portion of the spherical inner surface 70 of the constant volume chamber Cc formed in part by the particular liner shell 75.

In the upper cylindric end of each socket 74, a preferably removable intermediate ring member 76—1 is located, and as illustrated, each member 76—1 is externally cylindric and has an annular lower end face 76—2 seating against and registering with the annular upper end face 75—1 of the associated shell 75. The inner surface 76—3 of the ring member 76—1 is spherical and forms a continuation of the spherical inner surface 75—2 of the liner shell 75.

Also in the upper cylindric end of each socket 74, above the ring member 76—1, a preferably removable top member 76—4 is located, and as illustrated each top member 76—4 is externally cylindric and its upper end extends beyond the normally top wall 15 of the cylinder block portion 12 and into a cylindric recess 77 formed in the adjacent cylinder head lower wall 28.

In the normally lower face of each member 76—4 is formed a cavity 78 which includes a spherical inner surface portion 78—1 comprising continuations of the spherical inner surface portions of the associated ring member 76—1 and the associated shell 75, the continuing and registering inner spherical surfaces of all of which form the spherical inner surface 70 of the particular constant volume chamber.

Each cavity 78 also includes a flat surface portion 79—1 extending tangentially from the spherical inner surface portion 78—1 and opposite side surfaces 79—2 and 79—3 converging with the sides of the flat tangential surface 79—1 and with the spherical surface portion 78—1; the flat tangential surface 79—1, the opposite side surfaces 79—2 and 79—3 forming with the portion of the annular end face 76—5 of the intermediate ring member 76—1 opposite the flat tangential surface 79—1, the constant volume chamber end of the particular connecting passageway P.

The flat surface 79—1 of each member 76—4 is thus the constant volume chamber end of the flat inner face 73 of the passageway P taken as a whole.

The remaining portions of each passageway P are formed by an extension of the inner face 29 of the adjacent and connected varying volume chamber Cv, and by the side and bottom faces of a notch 80 formed in the upper end of the cylinder sleeve 14 of the particular chamber Cv and by the side and bottom faces of a notch 81 formed in the wall 15 of the cylinder block portion 12 between the cylinder sleeve notch 80 and the adjacent socket 74.

The air intake valve means heretofore described in general, comprise means operated in a usual manner for introducing preferably atmospheric air including gaseous oxygen, or in other words a combustion supporting medium, into each varying volume chamber Cv on the air intake stroke of the piston thereof; and the exhaust valve means heretofore described in general, provide means for exhausting each varying volume chamber Cv during the exhaust stroke of the piston thereof.

Means are also provided for injecting the preferably liquid hydrocarbon fuel into each constant volume chamber Cc preferably during the compression stroke of the associated piston, and as illustrated the fuel injecting means includes for each constant volume chamber Cc a pintle nozzle 82 each of which is operatively mounted in the cylinder block portion 12, and the discharge end 83 of each of which extends into and terminates in the constant volume chamber Cc, with which the particular nozzle is associated.

Each nozzle 82 is communicatingly connected in a usual manner by a tube 84 with one of the discharge outlets 85 of a usual fuel supply and distributing pump 86 which is driven by a shaft 87 connected in the usual manner with the gearing contained in the gear housing of the engine, not shown. The pump 86 includes timed means injecting a charge of fuel during the proper interval through each of the pipes 84 and the nozzle 82 served thereby into the particular constant volume chamber Cc with which the particular nozzle 82 is associated.

The pump 86 includes governing means which are controlled by a control arm 88 which is in effect the throttle for the engine; and the pump 86 is connected by a main fuel supply tube 89 in a usual manner with a source of the desired liquid fuel.

Each nozzle 82 is of usual construction, and is adapted to introduce into the constant volume chamber Cc with which it is associated, an atomized conical spray 90 of fuel particles, the conical spray having its origin O located between the plane of the inner face of the cylinder head and a plane of displacement of the piston from the inner face of the cylinder head, that is, at the crank shaft side of the passageway P; and the origin O of the spray is preferably located in the side of the internally spherical constant volume chamber Cc opposite the passageway P and the spray is preferably directed as illustrated sidewards and upwards towards the passageway P and towards the plane of the inner face 29 of the cylinder head, all as best shown in Fig. 2.

The longitudinal axis 91 of each conical spray 90 is preferably located in the plane, which is the plane of the drawing sheet of Fig. 2, passing through the center 71 of the associated preferably internally spherical constant volume chamber Cc and the longitudinal axis 72 of the bore 20 of the associated cylinder, and the longitudinal axis 91 of each concial spray 90 also preferably passes through the center 71 of the associated constant volume chamber Cc served thereby.

The apex angle 92 of each conical spray and the angle of the longitudinal axis 91 thereof with the plane of the associated flat inner cylinder head face 29 may be and preferably are as set forth in my said U. S. Letters Patent No. 1,960,093.

By constructing the constant volume chamber Cc each by the use of three separable and removable members, a shell 75, an intermediate ring 76—1, and a top member 76—4, a maximum internally spherical area is attained for the constant volume chamber formed thereby, and the parts are at the same time adapted for relatively easy manufacture, as compared with making the constant chambers, each with two parts, as shown in my said U. S. Letters Patent No. 1,960,093.

Further according to the present improvements, when as illustrated the axis 91 of each conical fuel spray is directed towards the passageway P, for minimizing and substantially eliminating "detonation" or "knock" in certain sizes and speeds of the engine without substantially decreasing the power thereof, each ring 76—1 is provided with deflector means, preferably in the form of an upwardly extending tongue or lip 76—7 which extends upwardly into the constant volume chamber opening of its associated passageway P, and the inner surface of each lip 76—7 is a continuation of the internally spherical surface 76—3 of the ring member 76—1 and the area of each tongue or lip 76—7 is such as to intercept such part of the conical fuel spray injected into the particular constant volume chamber $C_c$ as may reach the tongue or lip 76—7, and thus prevent the injection of any solid unmixed fuel through the passageway P into the varying volume chamber $C_v$.

The area of each tongue or lip 76—7 is preferably as illustrated relatively small as compared with the total area of the associated passageway P, the passageway opening above and about the sides of the lip or tongue.

The fact that the passageway P opens above and about the sides of the tongue or lip 76—7 permits the proper functioning of the preferably rectangular passageway P in serving to cooperate with the piston in obtaining an increasing velocity and straight direction of the air flowing into the constant volume chamber $C_c$ on the compression stroke of the piston, as the piston cuts off the cylinder end of the passageway P.

As aforesaid mechanical clearance only is preferably provided between each flat piston end face 62 and the opposite flat inner cylinder head face 29 at the top dead center position of the piston, and the total volume of each constant volume chamber $C_c$ and the associated passageway P, which constitute the clearance volume of the particular cylinder, is small relative to the maximum volume of the associated varying volume chamber $C_v$, so that the compression ratio of the engine may be high, for example 14 to 1.

It is also preferred as aforesaid that the length of each passageway P be as short as possible, and as illustrated the length of each passageway P is as short as the particular construction and arrangement of the engine 10 will permit.

In the operation of the engine 10 including the present improvements, the suction stroke of each piston draws intake air into the varying volume chamber $C_v$ thereof, and the succeeding compression stroke of the piston compresses the charge of air and forces it with very rapidly increasing pressure and velocity from the varying volume chamber $C_v$ through the associated passageway P and into the associated constant volume chamber $C_c$. As the piston moves across and substantially traverses the passageway P on its compression stroke, the opening of the passageway P into the varying volume chamber $C_v$ is rapidly reduced in area, which still further increases the pressure and velocity of the air being forced through the passageway P into the associated constant volume chamber $C_c$.

The fact that as aforesaid the passageway face 73 is an extension of the inner flat face 29 of the varying volume chamber $C_v$, and is tangential to the symmetrical and preferably spherical inner surface 70 of the constant volume chamber $C_c$, causes an unusually effective whirling of the air forced into the chamber $C_c$, the velocity of the whirl increasing as the piston moves across the passageway P and approaches top dead center.

The fuel is sprayed in the manner above set forth across and towards the whirling or revolving air in the combustion chamber $C_c$, and the resulting combustion is of the desired character, whereby the engine operates at relatively high speeds and with relatively high means indicated pressure.

The provision of one of the above described tongues or lips 76—7 extending into the constant volume chamber opening of each passageway P, substantially eliminates "detonation" or "knock" without materially decreasing the power of the engine as compared with the power thereof when not provided with the lips or tongues 76—7.

It is to be noted that when the conical fuel spray 90 for any particular constant volume chamber $C_c$ strikes the limited area of the associated lip 76—7 in the associated passageway P, towards which the spray is directed from the side of the constant volume chamber and at an angle to the tangential face of the passageway, there will be a deflection of a portion of the fuel spray above and about the sides of the lip 76—7 so that a portion of the fuel spray is impinged directly by the incoming air charge in and at the constant volume chamber end of the passageway P.

This combined effect is such that the mixing of the fuel charge with the incoming air charge commences virtually at the constant volume chamber end of the passageway and continues through the entire motion of the air charge in and through the constant volume chamber.

Forming each constant volume chamber $C_c$ and the constant volume chamber end of the passageway P therefor, by the above described three members 75, 76—1, and 76—4, permits the attaining of a maximum inner spherical area for the constant volume chamber formed by the members, and the attainment of a passageway formed by continuous surfaces and having a height less than the radius of the inner spherical surface and also having its top face tangential with the inner spherical surface, and the members 75, 76—1, and 76—4 being adapted for relatively easy commercial production.

In the particular engine illustrated in the drawings by way of example as embodying the present improvements, the upper part of each conical fuel charge strikes the associated lip 76—7, and as aforesaid because of the clearance about the sides and end of the lip, a substantial part of the fuel charge is deflected into the passageway P at the sides of the lip, and each unit volume of air entering the particular side chamber $C_c$ initiates a mixing action with the fuel charge substantially at the junction of the passageway with the side chamber, or in other words adjacent the sides of the lip.

There is a very short period of time during which the complete cycle of mixing and combustion must take place, and the initiation of the mixing action on each unit volume of air charge as it enters its spherical side chamber, and the consequent attainment of a mixing action through a maximum period or portion of the complete cycle of mixing and combustion, is of great benefit in the attainment of the improved operating characteristics of the improved engines hereof as above set forth.

I claim:

1. In an internal combustion engine, a cylinder having a bore extending therethrough, cylinder head means having an inner face extending across one end of the cylinder bore, a piston operative for reciprocation in the cylinder bore and forming with the cylinder bore and the cylinder head means inner face a cylinder chamber, walls forming a mixing and combustion chamber adjacent the cylinder and a passageway extending and providing a communication between the cylinder head end of the cylinder chamber and the mixing and combustion chamber, means for introducing a charge of combustion supporting medium into the cylinder chamber, deflector means located in the mixing and combustion chamber end of the passageway, the deflector means extending into the passageway and the passageway opening around the sides of the deflector means, and means for injecting fuel particles into the mixing and combustion chamber and against the deflector means.

2. In an internal combustion engine, a cylinder having a bore extending therethrough, a cylinder head having an inner face extending across one end of the cylinder bore, a piston operative for reciprocation in the cylinder bore and forming with the cylinder bore and the cylinder head inner face a cylinder chamber, walls forming a mixing and combustion chamber adjacent the cylinder and a passageway extending and providing a communication between the cylinder head end of the cylinder chamber and the mixing and combustion chamber, means for introducing a charge of combustion supporting medium into the cylinder chamber, a deflector tongue located in the mixing and combustion chamber end of the passageway, the deflector tongue extending into the passageway and the passageway opening around the sides and over the end of the deflector tongue, and means for injecting fuel particles into the mixing and combustion chamber and against the deflector tongue.

3. In an internal combustion engine, a cylinder having a bore extending therethrough, a cylinder head having an inner face extending across one end of the cylinder bore, a piston operative for reciprocation in the cylinder bore and forming with the cylinder bore and the cylinder head inner face a cylinder chamber, walls forming a mixing and combustion chamber adjacent the cylinder and a passageway extending and providing a communication between the cylinder head end of the cylinder chamber and the mixing and combustion chamber, means for introducing a charge of combustion supporting medium into the cylinder chamber, deflector means located in the mixing and combustion chamber end of the passageway, the deflector means extending into the passageway and the passageway opening around the sides of the deflector means, and means for injecting fuel particles into the mixing and combustion chamber and against the deflector means, the mixing and combustion chamber having a spherical inner surface continuous with one surface of the deflector means.

OTIS D. TREIBER.